US012624177B2

(12) United States Patent
Menozzi et al.

(10) Patent No.: US 12,624,177 B2
(45) Date of Patent: May 12, 2026

(54) PROCESS FOR PREPARATION OF OXYGEN BARRIER FILM

(71) Applicant: SABIC GLOBAL TECHNOLOGIES B.V., Bergen op Zoom (NL)

(72) Inventors: Daniela Menozzi, Geleen (NL); Estelle Julie Mathilde Poulet, Geleen (NL); Maria Soliman, Geleen (NL); Enrico Dalcanale, Geleen (NL); Roberta Pinalli, Geleen (NL); Ilaria Alfieri, Geleen (NL); Andrea Lorenzi, Geleen (NL); Jerome Vachon, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 769 days.

(21) Appl. No.: 17/606,946

(22) PCT Filed: Apr. 16, 2020

(86) PCT No.: PCT/EP2020/060655

§ 371 (c)(1),
(2) Date: Oct. 27, 2021

(87) PCT Pub. No.: WO2020/221589

PCT Pub. Date: Nov. 5, 2020

(65) Prior Publication Data

US 2022/0204711 A1 Jun. 30, 2022

(30) Foreign Application Priority Data

Apr. 29, 2019 (EP) .................................... 19171617

(51) Int. Cl.
*C08J 7/048* (2020.01)
*B05D 3/14* (2006.01)
*C08J 7/04* (2020.01)
*C08J 7/12* (2006.01)

(52) U.S. Cl.
CPC .............. *C08J 7/048* (2020.01); *B05D 3/144* (2013.01); *C08J 7/0427* (2020.01); *C08J 7/123* (2013.01); *C08J 2323/12* (2013.01); *C08J 2429/04* (2013.01)

(58) Field of Classification Search
CPC ........ B05D 7/04; B05D 2201/02; B05D 1/26; B05D 5/00; B05D 7/24; B05D 1/62; B05D 3/002; B32B 27/06; B32B 27/08; B29C 59/08; B29C 59/10; B29C 59/14; C08J 2323/02; C08J 2323/12; C08J 2429/04; C08J 7/0427; C08J 7/048; C08J 7/123
See application file for complete search history.

(56) References Cited

U.S. PATENT DOCUMENTS

| | | | | |
|---|---|---|---|---|
| 5,487,940 A * | 1/1996 | Bianchini | C08J 7/043 | 428/424.4 |
| 7,157,147 B2 | 1/2007 | Inui et al. | | |
| 2004/0253463 A1* | 12/2004 | Inui | C09D 129/04 | 428/448 |
| 2013/0196099 A1* | 8/2013 | Sakamoto | B32B 27/34 | 428/688 |
| 2014/0102899 A1 | 4/2014 | Berrada et al. | | |

FOREIGN PATENT DOCUMENTS

| | | | |
|---|---|---|---|
| EP | 1936004 | A1 | 6/2008 |
| EP | 2060391 | A1 | 5/2009 |
| WO | 2007042993 | A2 | 4/2007 |
| WO | 2009141605 | A1 | 11/2009 |

OTHER PUBLICATIONS

"Modification of surface properties of polypropylene (PP) film using DC glow discharge air plasma" by Pandiyaraj et al.; Applied Surface Science; 2009 (Year: 2009).*
HMI: "High Materials Innovation srl", Sep. 1, 2018 (Sep. 1, 2018), XP055631639, Retrieved from the Internet: URL :http ://s4b3a5b3abb6e0530. ji mcontent.com/download/ve rs ion/ 1457624888/module/13237888422/name/Oxyflav%20T echnical% 20Sheet%20English.pdf [retrieved on Oct. 14, 2019].
International Search Report for International Application No. PCT/ EP2020/060655, International Filing Date Apr. 16, 2020, Date of Mailing Aug. 6, 2020, 6 pages.
Written Opinion for International Application No. PCT/EP2020/ 060655, International Filing Date Apr. 16, 2020, Date of Mailing Aug. 6, 2020, 10 pages.

* cited by examiner

*Primary Examiner* — Yan Lan
(74) *Attorney, Agent, or Firm* — CANTOR COLBURN LLP

(57) ABSTRACT

The invention relates to a process for the preparation of an oxygen barrier film having an oxygen barrier layer and a treated substrate, comprising the steps of: a) subjecting a polyolefin substrate to a surface treatment to obtain the treated substrate wherein the surface under the parts of the curves corresponding to the C—O, C—N and C═O groups is at least 10% based on the total surface under the curve as obtained by X-ray photoelectron spectroscopy (XPS), b) applying an aqueous or hydroalcoholic coating composition comprising 0.1 to 25 wt % of polyvinyl alcohol, 0.1 to 30 wt % of a metal alkoxide and optional silicate minerals on the treated substrate obtained by step a) and c) drying the coating composition to obtain the oxygen barrier layer resulting in the oxygen barrier film, wherein the amount of the optional silicate minerals in the coating composition is less than 10 parts by weight per 100 parts by weight of the polyvinyl alcohol in the coating composition.

19 Claims, No Drawings

PROCESS FOR PREPARATION OF OXYGEN BARRIER FILM

CROSS REFERENCE TO RELATED APPLICATIONS

This application is a National Stage application of PCT/EP2020/060655, filed Apr. 16, 2020, which claims the benefit of European Application No. 19171617.4, filed Apr. 29, 2019, both of which are incorporated by reference in their entirety herein.

FIELD OF THE INVENTION

The invention relates to a process for the preparation of an oxygen barrier film. The invention further relates to an oxygen barrier film obtained or obtainable by the process and its applications such as in the packaging sector, for instance for the packaging of food or pharmaceutical products.

BACKGROUND

Materials suitable for use as a packaging should possess gas-barrier properties, in particular against oxygen, water vapour, carbon dioxide and other gases which could cause the content of the packaging to deteriorate.

Commercially available package for potato chips typically uses aluminum oxide (AlOx) coated PET film. Integrity of packages can be lost during the storage and distribution due to the presence of defects in the seal area or package body as a result of abusive handling. In particular, abusive handling typically during shipments results in stretching of the film, which causes the deterioration of oxygen barrier property.

EP1936004 discloses a method for producing a transparent barrier film for the purposes of packaging foodstuffs by a multistage vacuum plasma coating. The method comprises pretreating the substrate film by means of a plasma pretreatment; applying a thin incompletely closed first layer of aluminum oxide (AlOx) on the substrate film by magnetron sputtering, applying a closed second layer based on aluminum oxide (AlOx*) to the first layer by plasma-activated vapor deposition in vacuo. EP1936004 does not mention the deterioration of oxygen barrier property after stretching.

WO2007/042993 discloses a laminated material comprising a substrate of a plastic material and at least one hybrid organic-inorganic layer having gas-barrier properties. The hybrid organic-inorganic layer is formed on the surface of the substrate by deposition of an aqueous or hydroalcoholic coating composition comprising polyvinyl alcohol and a metal alkoxide. WO2007/042993 does not mention the deterioration of oxygen barrier property after stretching.

It is an objective of the invention to provide an oxygen barrier film which retains its oxygen barrier property even after stretching.

SUMMARY OF THE INVENTION

The present invention provides a process for the preparation of an oxygen barrier film having an oxygen barrier layer and a treated substrate, comprising the steps of:

a) subjecting a polyolefin substrate to a surface treatment to obtain the treated substrate wherein the surface under the parts of the curves corresponding to the C—O, C—N and C═O groups is at least 10% based on the total surface under the curve as obtained by X-ray photoelectron spectroscopy (XPS), b) applying an aqueous or hydroalcoholic coating composition comprising 0.1 to 25 wt % of polyvinyl alcohol and 0.1 to 30 wt % of a metal alkoxide on the treated substrate obtained by step a) and c) drying the coating composition to obtain the oxygen barrier layer resulting in the oxygen barrier film.

The present invention provides a process for the preparation of an oxygen barrier film having an oxygen barrier layer and a treated substrate, comprising the steps of:

a) subjecting a polyolefin substrate to a surface treatment to obtain the treated substrate wherein the surface under the parts of the curves corresponding to the C—O, C—N and C═O groups is at least 10% based on the total surface under the curve as obtained by X-ray photoelectron spectroscopy (XPS), b) applying an aqueous or hydroalcoholic coating composition comprising 0.1 to 25 wt % of polyvinyl alcohol, 0.1 to 30 wt % of a metal alkoxide and optional silicate minerals on the treated substrate obtained by step a) and c) drying the coating composition to obtain the oxygen barrier layer resulting in the oxygen barrier film, wherein the amount of the optional silicate minerals in the coating composition is less than 10 parts by weight per 100 parts by weight of the polyvinyl alcohol in the coating composition.

According to the invention, an oxygen barrier film is prepared from a polyolefin substrate by a surface treatment followed by the application and drying of a coating composition. It was surprisingly found that the oxygen barrier film obtained has a good oxygen barrier property even after stretching. This allows the oxygen barrier film to maintain its oxygen barrier property after abusive handling such as during transportation.

The present invention further provides a surface treatment process comprising the step of:

a) subjecting a polyolefin substrate to a surface treatment to obtain the treated substrate wherein the surface under the parts of the curves corresponding to the C—O, C—N and C═O groups is at least 10% based on the total surface under the curve as obtained by X-ray photoelectron spectroscopy (XPS).

Such a treated substrate may be used for the preparation of an oxygen barrier film.

DETAILED DESCRIPTION

Surface Treatment

The surface treatment for obtaining a functionalized substrate may e.g. be performed by a plasma treatment, a corona treatment or a flame treatment. These procedures can be used to change the surface topography to promote mechanical interlocking, but the main purpose is to change the chemical composition of the polymer chain at the surface by introducing new functional groups such as C—O and C═O into the polymer surface. These new carbon functional groups aid in the bonding of the coatings to the polymer substrate by increasing its surface energy and wettability. These treatments are per se well-known.

Flame treatment is a procedure that passes the surface of the polymer through oxidizing flames. The flames contain oxygen radicals which then bond on the surface of polymer to form oxygen functional groups. Flame treatment improves the adhesion qualities of polymers prior to the application of coatings and adhesives. Such treatment is usually performed with a burner supplied with a fuel (e.g. natural gas) and an oxidizer (e.g. oxygen) that are pre-mixed leading to surface oxidation.

Corona treatment and plasma treatment are both performed using one or more high voltage electrodes which charge the surrounding blown gas molecules and ionize them. Corona treatment is done through the use of corona discharge at atmospheric pressure. The method creates a stream of ions and electrons which are accelerated across an electric field. This stream is created through the use of high voltage to promote high velocity collision between particles and neutral molecules which leads to the production of ions. The generated particles bombard the surface of the polymer and form oxygen functional groups on the surface. In plasma treatment, the overall plasma density is much greater which enhances the rate and degree to which the ionized molecules are incorporated onto a materials' surface. An increased rate of ion bombardment occurs which may result in stronger material bonding traits depending on the gas molecules used in the process.

Plasma treatment is described e.g. also in [0007]-[0009] of US2014102899, incorporated herein as follows:

A plasma may be produced by heating a gas to ionize its molecules or atoms, e.g. in a flame to produce a flame-based plasma, or by applying strong electromagnetic fields, e.g., by using a laser or microwave generator. However, all methods of producing a plasma require the input of energy to produce and sustain it. For example, a plasma can be generated when an electrical current is applied across a dielectric gas or fluid in a discharge tube. The potential difference and subsequent electric field pull the bound, negative, electrons toward the anode while the cathode pulls the nuclei. As the voltage increases, the current electrically polarizes the material beyond its dielectric limit into a stage of electrical breakdown, and the material transforms from an insulator into a conductor as it becomes increasingly ionized. Collisions between electrons and neutral gas atoms create more ions and electrons, and the number of charged particles increases rapidly after about 20 successive sets of collisions due to the small mean free path.

Plasmas are useful in industrial manufacturing for cleaning sensitive products such as computer chips and other electronic components. Plasma cleaning involves the removal of impurities and contaminants from surfaces through the application of an energetic plasma. These treatment systems use electric fields to direct reactive gases toward the surface. Low molecular weight materials such as water, absorbed gases and polymer fragments are knocked off the surface to expose a clean, uncontaminated surface. At the same time a percentage of the reactive components in the plasma bond to the freshly exposed surface, changing the chemistry of the surface and imparting the desired functionalities. Gases such as argon and oxygen, as well as mixtures such as air and hydrogen/nitrogen can be used. The plasma can be produced by using a high frequency voltage (typically kHz to MHz) to ionize a gas at low pressure (e.g. at one thousandth of atmospheric pressure or lower, i.e. in a vacuum) or alternatively, the plasma can be produced at atmospheric pressure. The plasma includes atoms, molecules, ions, electrons, free radicals, and photons in the short wave ultraviolet (vacuum UV, or VUV for short) range. This mixture, which can be at room temperature, then interacts with any surface placed in the plasma.

If the gas used is oxygen, the plasma is an effective, economical, environmentally safe method for critical cleaning. The VUV energy can break most organic bonds of surface contaminants to disrupt high molecular weight contaminants. A second cleaning action can be carried out using the highly reactive oxygen species ($O_2^+$, $O_2$, $O_3$, O, $O^+$, $O^-$, ionized ozone, metastable excited oxygen, and free electrons) produced in the plasma. These species react with organic contaminants to form $H_2O$, CO, $CO_2$, and low molecular weight hydrocarbons which have relatively high vapor pressures and are easily evacuated from low pressure chambers during processing. The resulting surface is ultraclean.

The plasma treatment may be performed at an atmospheric pressure. Preferably, however, the plasma treatment is performed at a pressure less than the atmospheric pressure, preferably substantially lower than the atmospheric pressure. For example, the plasma treatment is performed at a pressure of e.g. 10 to 2000 Pa, e.g. 20 to 1500 Pa, 30 to 1000 Pa, 40 to 500 Pa or e.g. 50 to 500 Pa.

The plasma treatment may be performed e.g. in oxygen, nitrogen, hydrogen, ammonia, a mixture of oxygen and nitrogen or air.

Plasma treatment in oxygen increases the amount of the hydroxyl groups on the surface of the resulting treated substrate.

Plasma treatment in ammonia increases the amount of the amino groups on the surface of the resulting treated substrate.

The surface treatment may be performed more than one time, at the same or different conditions. For example, a first plasma treatment in oxygen may be followed by a second plasma treatment in hydrogen. The second plasma treatment may convert the carboxylic groups formed by the first plasma treatment into hydroxyl groups.

The surface treatment is performed such that a sufficient amount of C—O, C—N and C═O functional groups is formed. Conditions such as the power output and the duration of plasma treatment may be selected by the skilled person. Generally, a higher power output and a longer duration result in a larger amount of C—O, C—N and C═O functional groups.

The plasma treatment may be performed e.g. at a power output of 10 to 80 W, e.g. 30 to 80 W or 55 to 80 W, for a period of 5 to 500 seconds, e.g. 10 to 100 seconds or 30 to 100 seconds. Preferably, the plasma treatment is performed at a power output of 55 to 80 W for a period of 30 to 100 seconds.

Polyolefin Substrate

Preferably, the polyolefin substrate is made of polypropylene or polyethylene. Preferably, polyethylene is a linear low density polyethylene (LLDPE).

With linear low density polyethylene (LLDPE) as used herein is meant a low density polyethylene copolymer comprising ethylene and a C3-C10 alpha-olefin co monomer (ethylene-alpha olefin copolymer). Suitable alpha-olefin co monomers include 1-butene, 1-hexene, 4-methyl pentene and 1-octene. The preferred co monomer is 1-hexene. Preferably, the alpha-olefin co monomer is present in an amount of about 5 to about 20 percent by weight of the ethylene-alpha olefin copolymer, more preferably an amount of from about 7 to about 15 percent by weight of the ethylene-alpha olefin copolymer.

For purpose of the invention, the density of the linear low density polyethylene is determined using ISO1872-2.

Preferably, the melt flow index of the linear low density polyethylene ranges from 0.1 to 4 g/10 min, for example from 0.3 to 3 g/10 min, for example from 0.2 to 2 g/10 min, for example from 0.5 to 1.5 g/10 min. For purpose of the invention, the melt flow index is determined herein using ISO1133-1:2011 (190° C./2.16 kg).

The technologies suitable for the LLDPE manufacture include but are not limited to gas-phase fluidized-bed polymerization, polymerization in solution, and slurry polymerization. According to a preferred embodiment of the present invention the LLDPE has been obtained by gas phase polymerization in the presence of a Ziegler-Natta catalyst. According to another preferred embodiment, the LLDPE may be obtained by gas phase polymerization in the presence of a metallocene catalyst.

The LLDPE may have a density of e.g. 915 to 930 $kg/m^3$.

With polypropylene as used herein is meant propylene homopolymer or a copolymer of propylene with ethylene and/or an α-olefin, for example an α-olefin chosen from the group of α-olefins having 4 to 10 C-atoms, for example wherein the amount of units derived from ethylene and α-olefin is 1 to 10 wt % based on the total propylene copolymer.

Polypropylene and a copolymer of propylene with ethylene and/or an α-olefin can be made by any known polymerization technique as well as with any known polymerization catalyst system. Regarding the techniques, reference can be given to slurry, solution or gasphase polymerizations; regarding the catalyst system reference can be given to Ziegler-Natta, metallocene or single-site catalyst systems. All are, in themselves, known in the art.

For example, the polyolefin substrate has a thickness of 7 to 500 μm, for example of 10 to 100 μm or of 100 to 500 μm.

Functional Group

Step a) results in a treated substrate having a certain amount of C—O, C—N and C═O functional groups as determined by X-ray photoelectron spectroscopy (XPS).

The surface under the parts of the curves corresponding to the C—O, C—N and C═O groups is at least 10%, preferably at least 15%, based on the total surface under the curve as obtained by X-ray photoelectron spectroscopy (XPS) of the treated surface obtained by step a). The details of the XPS are described in the experimental section.

Coating Composition

In step b), an aqueous or hydroalcoholic coating composition comprising 0.1 to 25 wt % of polyvinyl alcohol and 0.1 to 30 wt % of a metal alkoxide is applied on the treated substrate. The amounts are with respect to the total coating composition.

Preferably, step b) is performed within 15 days, more preferably within 7 days, more preferably within 3 days, more preferably within 24 hours, from step a).

The metal alkoxide of the coating composition is a compound which may be represented by the formula MRn, in which M is a metal atom, preferably Si, Al, Zr o Ti, n is the valency of M and the groups R taken n times each independently represent an alkyl or alkyloxy radical having from 1 to 4 carbon atoms (such as methyl, ethyl, propyl, butyl, methoxy, ethoxy, propoxy, butoxy), provided that at least two of the groups R are alkyloxy radicals. The most preferred metal alkoxide is tetraethoxysilane (TEOS) in which M is silicon (Si), n is 4 and each of the groups R is ethyl.

Polyvinyl alcohol (PVA) is a polymer obtained from the basic hydrolysis of polyvinyl acetate and has the following structure:

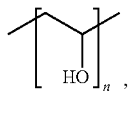, wherein n is from 500 to 5000.

Fully hydrolysed PVA (approximately 97-100% of the acetate groups substituted) or partially hydrolysed PVA (approximately 86-89% of the acetate groups substituted), both of which are commercially available, may be used for the preparation of the oxygen barrier film of the invention.

The coating composition further comprises a solvent. The solvent used for the coating composition may be water or a mixture of water and ethyl alcohol, preferably at a v/v ratio between water and ethyl alcohol varying between 100:0 and 70:30. The total amount of the polyvinyl alcohol, the metal alkoxide and the solvent may be at least 90 wt %, at least 95 wt %, at least 98 wt %, at least 99 wt % or 100 wt % of the coating composition.

The coating composition may optionally comprise silicate minerals. However, the amount of the optional silicate minerals in the coating composition is less than 10 parts by weight per 100 parts by weight of the polyvinyl alcohol in the coating composition. Preferably, the amount of the optional silicate minerals in the coating composition is less than 8 parts by weight, 5 parts by weight, 3 parts by weight or 1 part by weight, per 100 parts by weight of the polyvinyl alcohol in the coating composition. Preferably, the coating composition is free of silicate minerals. The limited or no amount of the silicate minerals in the coating composition provides an advantage that the resulting oxygen barrier layer is soft and allows it to be stretched without breaking and keeps the oxygen barrier property even after stretching Silicate minerals include montmorillonite, beidellite, nontronite, saponite, hectorite, stevensite, organic bentonite, kaolinite, dickite, nakhlite, halloysite, chrysotile, lizardite, antigorite, pecoraite, nepoaito, greenalite, caryopilite, amesite, Al-lizardite, bacherin, burindorianite, kerianite, kuronstedaito, pyrophyllite, talc, keroraito, williamsite, pemeraito, minnesotaite, mica, muscovige, phengite, illite, sericite, glauconite, celadonite, tobelite, palagonite, phlogopite, biotite, chlorite and vermiculite. These are described as a stratified silicate in EP1428657.

In order to catalyse the alkoxide hydrolysis and condensation reaction, the pH of the coating composition is preferably adjusted to slightly acidic values, for instance by the solvent comprising hydrochloric acid (HCl). The amount of HCl may e.g. be approximately 0.03 to approximately 1 wt % of the coating composition.

Step b) may be performed by spraying, dip-coating or spin-coating techniques or any other appropriate conventional technique.

Preferably, step c) is performed at relatively low temperatures, preferably between 40 QC and 90 QC, more preferably 60 QC, for a relatively short time, preferably below 5 minutes, for instance for 60 seconds.

Preferably, the oxygen barrier layer obtained by drying the coating composition has a thickness of 0.2 to 10.0 μm, for example 0.5 to 8.0 μm or 1.0 to 5.0 μm. Generally, the ratio between the thickness of the treated substrate and the thickness of the oxygen barrier film is 20:1 to 3:1

Oxygen Barrier Film

The invention also relates to the oxygen barrier film obtained or obtainable by the process according to the invention.

The invention also relates to an oxygen barrier film comprising a polyolefin substrate and an oxygen barrier layer provided on the polyolefin substrate, wherein the oxygen barrier film has an oxygen transmission rate OTR1 measured at a relative humidity of 0% and a pressure of $1.013\times10^5$ Pa, wherein OTR1 is at most 100 cc/($m^2$·24 h), more preferably at most 50 cc/($m^2$·24 h), more preferably at most 20 cc/($m^2$·24 h) and OTR2-OTR1 is at most 200 cc/($m^2$·24 h), more preferably at most 150 cc/($m^2$·24 h), more preferably at most 100 cc/($m^2$·24 h).

Preferably, OTR2 is at most 250 cc/($m^2$·24 h), more preferably at most 200 cc/($m^2$ 24 h), more preferably at most 100 cc/($m^2$·24 h).

Preferably, the oxygen barrier layer is made from an aqueous or hydroalcoholic coating composition comprising 0.1 to 25 wt % of polyvinyl alcohol, 0.1 to 30 wt % of a metal alkoxide and optional silicate minerals.

The invention also relates to an article comprising the oxygen barrier film according to the invention. The article may e.g. be a packaging of food or pharmaceutical products, such as pouches, form fill seal, bags, sachets or rigid trays.

For example, the oxygen barrier film according to the invention has a thickness of 7.2 to 510 μm or 7 to 500 μm, for example of 10 to 100 μm or of 100 to 500 μm. The oxygen barrier film having a thickness of up to 100 μm may be used as a packaging of food or pharmaceutical products, such as pouches, form fill seal, bags and sachets without thermoforming steps. The oxygen barrier film having a thickness of 100 to 500 μm may be used as a rigid tray for food optionally after thermoforming steps. The thermoforming steps are per se well-known.

Oxygen-Barrier Properties

Oxygen-barrier properties are typically measured by means of oxygen transmission rate (OTR) which is expressed in cc/($m^2$·24 h), measured at $1.013\times10^5$ Pa.

Preferably, the oxygen barrier film according to the invention has an oxygen transmission rate of at most 100 cc/($m^2$·24 h), more preferably at most 50 cc/($m^2$ 24 h), more preferably at most 20 cc/($m^2$·24 h), at a relative humidity of 0% and a pressure of $1.013\times10^5$ Pa.

Preferably, the oxygen barrier film according to the invention has an oxygen transmission rate of at most 100 cc/($m^2$·24 h), more preferably at most 50 cc/($m^2$ 24 h), more preferably at most 20 cc/($m^2$·24 h), at a relative humidity of 50% and a pressure of $1.013\times10^5$ Pa.

Preferably, the oxygen barrier film according to the invention has an oxygen transmission rate of at most 250 cc/($m^2$·24 h), more preferably at most 200 cc/($m^2$ 24 h), more preferably at most 100 cc/($m^2$·24 h), at a relative humidity of 0% and a pressure of $1.013\times10^5$ Pa, after being stretched for 20% in one direction at a speed of 10 mm/min at 150 to 170° C.

Preferably, the oxygen barrier film according to the invention has an oxygen transmission rate of at most 250 cc/($m^2$·24 h), more preferably at most 200 cc/($m^2$ 24 h), more preferably at most 150 cc/($m^2$·24 h), at a relative humidity of 50% and a pressure of $1.013\times10^5$ Pa, after being stretched for 20% in one direction at a speed of 10 mm/min at 150 to 170° C.

Preferably, the oxygen barrier film according to the invention has an oxygen transmission rate of at most 350 cc/($m^2$·24 h), more preferably at most 300 cc/($m^2$ 24 h), more preferably at most 250 cc/($m^2$·24 h), at a relative humidity of 0% and a pressure of $1.013\times10^5$ Pa, after being stretched for 24% in a first direction at a speed of 10 mm/min at 150 to 170° C. and for 20% in a second direction perpendicular to the first direction at a speed of 10 mm/min at 150 to 170° C.

Preferably, the oxygen barrier film according to the invention has an oxygen transmission rate of at most 350 cc/($m^2$·24 h), more preferably at most 300 cc/($m^2$ 24 h), more preferably at most 250 cc/($m^2$·24 h), at a relative humidity of 50% and a pressure of $1.013\times10^5$ Pa, after being stretched for 20% in a first direction at a speed of 10 mm/min at 150 to 170° C. and for 20% in a second direction perpendicular to the first direction at a speed of 10 mm/min at 150 to 170° C.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXPERIMENTS

Ex 2-Ex 5

Preparation of Oxygen Barrier Film

Polypropylene substrates having a thickness of 25 μm made from polypropylene homopolymer 525P having MFR of 3.0 dg/min (ISO1133-1:2011, 230° C./2.16 kg) were subjected to vacuum plasma treatment at a pressure of 30 Pa using air at conditions indicated in table 1. The treated substrates were stored in aluminum foil just after the treatments to avoid oxygen. XPS was performed on the treated substrates.

Within 24 hours from the plasma treatment, a coating composition Oxyflav commercially available from High Materials Innovation srl (Parma, Italy) was poured on the surface of the treated substrate and coated over the total surface by means of a roll. The coating composition was subsequently dried. The thickness of the coating was 5 μm. Oxygen transmission rates were measured.

Stretching

The coated films were subjected to stretching tests. The coated films were stretched in one direction for 22% (±2%) at 10 mm/min speed while heating at 150-170° C. and the oxygen transmission rates were measured. Subsequently, these films were stretched in the other direction under the same conditions and the oxygen transmission rates were measured.

XPS

X-ray Photoelectron Spectroscopy (XPS) was performed in an UHV (Ultra High Vacuum) system (base pressure $2\times10^{-10}$ mbar). The apparatus is equipped with a manipulator with five freedom degrees, receiving a XL25 type sample holder (from ThermoFisher Scientific, VG). Samples with typical dimensions of 20 mm×15 mm were extracted for each material type by cutting the original PP foils in two distant regions (far from the external borders), the first one being almost central, the second one in a peripheral region. Each sample was fixed by carbon tape on a silicon wafer, so that the surface planarity was granted getting rid of the high flexibility typical of polymers. Sample surface was grounded by a metal clip. No surface treatments have been performed before insertion in vacuum, which occurs by a fast entry load lock system (base pressure $7\times10^{-5}$ mbar): due to the typical high outgassing rate of polymers, each sample remained one night in fast entry.

XPS was performed by using a Mg photon source (1253.6 eV), a XR3E2 non monochromated Mg/Mg double anode source (from VG, now ThermoFisher Scientific), at a typical power of 300 W (20 mA and 15 kV). The electron energy analyzer is a hemispherical VSW HA100 with PSP electronic control unit, working in constant Pass Energy (PE) mode with a maximum energy resolution of 0.86 eV. The electron acceptance is normal to the surface, leading to a maximum sampled depth of about 8 nm, while the angle between photons and emitted electrons is 54.7°. No charge compensation was applied. Survey spectra were acquired using a PE of 50 eV, while all core levels spectra were at a PE of 20 eV. Quantitative analysis (leading to the evaluation of the atomic percentage) is based on the elemental sensitivity factor standard approach, properly taking into account the analyzer electron transmission coefficient. Binding energy is typically referred to the Au4f7/2 core level at 84.00 eV, as well as in our case to the C1s core level at 285 eV (C—C species). The peak lineshape was deconvoluted using a Voigt profile, after subtracting the background by means of a Shirley function. The typical uncertainty for the peak energy position is ±0.05 eV, whereas for the full width at half maximum (FWHM) is about ±5%. The maximum error for the atomic percentage evaluation is about ±0.1.

The surface under the parts of the curves corresponding to the C—O and C═O groups based on the total surface under the curve (sum of the C—O and C═O functional groups) is indicated as % O in Table 1. No C—N functional group was detected in these examples. The results are the average of 2 results from 2 areas.

Oxygen Transmission Rate

Oxygen transmission rate (OTR) were measured at relative humidity (R.H.) of 0% and 50% at 23° C. and $1.013\times10^5$ Pa. At least two films were measured for each sample, and obtained transmissions are reported as the average of both measurements.

The results of the XPS measurements and the OTR measurements are shown in Table 1.

TABLE 1

| | | | | | OTR (cc/$m^2$ * 24 h) | | | | | |
|---|---|---|---|---|---|---|---|---|---|---|
| | | | % C | % O | Before | | $1^{st}$ stretch | | $2^{nd}$ stretch | |
| Name | Power | Time | (±0.5) | (±0.5) | 0% RH | 50% RH | 0% RH | 50% RH | 0% RH | 50% RH |
| CEx 1 | — | — | 100% | | 2200 | 3500 | 2210 | 2379 | 2210 | 2379 |
| Ex 2 | 78 W | 60 s | 83.15 | 16.85 | 14 | 14 | 76 | 174 | 216 | 219 |
| Ex 3 | 50 W | 20 s | 83.91 | 16.09 | 68 | 70 | 134 | 152 | 314 | 308 |
| Ex 4 | 50 W | 10 s | 86.80 | 13.20 | 40 | 57 | Not measured | | | |
| Ex 5 | 32 W | 10 s | 87.80 | 12.2 | 40 | 38 | 229 | 225 | 1781 | 1848 |

The difference between the OTR at 0% RH after first stretching (OTR2) and the OTR at 0% RH before stretching (OTR1) is:

Ex 2: 62 cc/($m^2$·24 h)

Ex 3: 66 cc/($m^2$·24 h)

Ex 5: 189 cc/($m^2$·24 h)

CEx 1 is an experiment on the same PP substrate but on which no plasma treatment was performed and no coating composition was applied. The PP substrate has a very high oxygen transmission rate (low oxygen barrier property).

It can be seen that the oxygen transmission rate has dramatically decreased by preparing the oxygen barrier film by the process according to the invention. Further, even after stretching, the good oxygen permeability performance is largely maintained. This good oxygen permeability performance is still maintained after being subjected to a relatively high temperature. Same trend can be observed at a relative humidity of 0% and 50%.

With the increase in power and time of the plasma treatment, the amount of the functional groups increases. This in turn retains a higher oxygen barrier property being retained after stretching.

CEx 6-Ex 9

LLDPE

In experiments 7 and 9, experiment 2 was repeated using an LLDPE substrate having a thickness of 25 μm or 70 μm. The LLDPE was low linear density polyethylene 6118NE having MFR of 0.9 dg/min (ISO1133-1:2011, 190° C./2.16 kg). CEx 6 and CEx 8 correspond to the LLDPE substrates on which no plasma treatment was performed and no coating composition was applied.

OTR measurements were performed on the samples which have not been stretched. The measurements were performed at relative humidity (R.N.) of 0%, 25% and 50% at 23° C. and $1.013\times10^5$ Pa. Results are shown in Table 2.

TABLE 2

| | | | | OTR ($cm^3/m^2$ * 24 h) | | |
|---|---|---|---|---|---|---|
| Name | Thickness | Power | Time | 0% RH | 25% RH | 50% RH |
| CEx 6 | 25 μm | — | — | 7700 | — | — |
| Ex 7 | 25 μm | 78 W | 60 s | 216 | 181 | 216 |
| CEx 8 | 70 μm | — | — | 2779 | — | — |
| Ex 9 | 70 μm | 78 W | 60 s | 63 | 77 | 75 |

It can be seen that the oxygen transmission rate has dramatically decreased by preparing the oxygen barrier film by the process according to the invention.

The invention claimed is:

1. A process for the preparation of an oxygen barrier film having an oxygen barrier layer and a treated substrate, the process comprising the steps of:

a) subjecting a polyolefin substrate to a surface treatment to obtain a treated substrate wherein the surface under the parts of the curves corresponding to the C—O, C—N and C═O groups is at least 10% based on the total surface under the curve as obtained by X-ray photoelectron spectroscopy (XPS), b) applying an aqueous or hydroalcoholic coating composition comprising 0.1 to 25 wt % of polyvinyl alcohol, 0.1 to 30 wt % of a metal alkoxide and optional silicate minerals on the treated substrate obtained by step a) and c) drying the coating composition to obtain the oxygen barrier layer resulting in the oxygen barrier film, wherein the amount of the optional silicate minerals in the coating composition is less than 10 parts by weight per 100 parts by weight of the polyvinyl alcohol in the coating composition, wherein step a) is a plasma treatment performed at a pressure of 30 to 500 Pa, in air, at a power output of 55 to 80 W for a period of 30 to 100 seconds, and wherein the polyolefin substrate is a polyethylene substrate and the oxygen barrier film has an oxygen transmission rate of at most 100 cc/($m^2$·24h), at a relative humidity of 0% and a pressure of $1.013\times10^5$ Pa.

2. The process according to claim 1, wherein the surface under the parts of the curves corresponding to the C—O, C—N and C═O groups is at least 15% based on the total surface under the curve as obtained by X-ray photoelectron spectroscopy (XPS) of the treated surface obtained by step a).

3. The process according to claim 1, wherein the metal alkoxide is a compound of the formula MRn, in which M is a metal atom, n is the valency of M and the groups R taken n times each independently represent an alkyl or alkyloxy radical having from 1 to 4 carbon atoms, provided that at least two of the groups R are alkyloxy radicals.

4. The process according to claim 3, wherein M is silicon (Si), aluminium (Al), zirconium (Zr) or titanium (Ti).

5. The process according to claim 3, wherein the metal alkoxide is tetraethoxysilane (TEOS).

6. The process according to claim 1, wherein the polyolefin substrate has a thickness of 7 to 500 μm.

7. The process according to claim 1, wherein the oxygen barrier layer has a thickness of 0.2 to 10.0 μm.

8. The oxygen barrier film obtained by the process according to claim 1.

9. An article comprising the oxygen barrier film according to claim 8.

10. The article according to claim 9, wherein the article is a packaging of food or a pharmaceutical product.

11. The process according to claim 1, wherein the oxygen transmission rate of the oxygen barrier film is at most 250 cc/($m^2$·24h), at a relative humidity of 0% and a pressure of $1.013\times10^5$ Pa, after being stretched for 20% in one direction at a speed of 10 mm/min at 150 to 170° C.

12. The process according to claim 1, wherein (the oxygen transmission rate of the oxygen barrier film measured at a relative humidity of 0% and a pressure of $1.013\times10^5$ Pa after being stretched for 20% in one direction at a speed of 10 mm/min at 150° C.)–(the oxygen transmission rate of the oxygen barrier film measured at a relative humidity of 0% and a pressure of $1.013\times10^5$ Pa) is at most 200 cc/($m^2$· 24h).

13. The process according to claim 12, wherein OTR2 is at most 250 cc/($m^2$·24h).

14. The process according to claim 1, wherein the pressure at which step a) is performed is 50 to 500 Pa.

15. The process according to claim 1, wherein the oxygen transmission rate of the oxygen barrier film is at most 50 cc/($m^2$·24h), at a relative humidity of 0% and a pressure of $1.013\times10^5$ Pa.

16. The process according to claim 1, wherein the oxygen transmission rate of the oxygen barrier film is at most 20 cc/($m^2$·24h), at a relative humidity of 0% and a pressure of $1.013\times10^5$ Pa.

17. A process for the preparation of an oxygen barrier film having an oxygen barrier layer and a treated substrate, the process comprising the steps of:

a) subjecting a polyolefin substrate to a surface treatment to obtain a treated substrate wherein the surface under the parts of the curves corresponding to the C—O, C—N and C═O groups is at least 10% based on the total surface under the curve as obtained by X-ray photoelectron spectroscopy (XPS), b) applying an aqueous or hydroalcoholic coating composition comprising 0.1 to 25 wt % of polyvinyl alcohol, 0.1 to 30 wt % of a metal alkoxide and optional silicate minerals on the treated substrate obtained by step a) and c) drying the coating composition to obtain the oxygen barrier layer resulting in the oxygen barrier film, wherein the amount of the optional silicate minerals in the coating composition is less than 10 parts by weight per 100 parts by weight of the polyvinyl alcohol in the coating composition, wherein the polyolefin substrate is a polypropylene substrate and the oxygen barrier film has an oxygen transmission rate of at most 50 cc/($m^2$·24h), at a relative humidity of 0% and a pressure of $1.013\times10^5$ Pa, or the polyolefin substrate is a polyethylene substrate and the oxygen barrier film has an oxygen transmission rate of at most 100 cc/($m^2$·24h), at a relative humidity of 0% and a pressure of $1.013\times10^5$ Pa.

18. The process according to claim 17, wherein the polyolefin substrate is a polypropylene substrate and the oxygen transmission rate of the oxygen barrier film is at most 50 cc/($m^2$·24h), at a relative humidity of 0% and a pressure of $1.013\times10^5$ Pa.

19. The process according to claim 17, wherein the polyolefin substrate is a polyethylene substrate and the oxygen transmission rate of the oxygen barrier film is at most 100-20 cc/($m^2$·24h), at a relative humidity of 0% and a pressure of $1.013\times10^5$ Pa.

* * * * *